United States Patent [19]

Ohtorii et al.

[11] Patent Number: 4,723,152
[45] Date of Patent: Feb. 2, 1988

[54] COPYING MACHINE

[75] Inventors: Masakazu Ohtorii; Takamichi Nishihama; Kazuma Kan; Ikuo Sho, all of Shiga, Japan

[73] Assignee: Dainippon Screen Mfg. Co., Ltd., Kyoto, Japan

[21] Appl. No.: 894,885

[22] Filed: Aug. 8, 1986

[30] Foreign Application Priority Data

| Aug. 28, 1985 | [JP] | Japan | 60-186424 |
| Sep. 4, 1985 | [JP] | Japan | 60-195291 |
| Sep. 13, 1985 | [JP] | Japan | 60-204163 |

[51] Int. Cl.$^4$ .............................................. G03B 29/00
[52] U.S. Cl. .......................................... 355/28; 355/77
[58] Field of Search ............... 355/27, 28, 91, 100, 355/77

[56] References Cited

U.S. PATENT DOCUMENTS

| 4,029,404 | 6/1977 | Mizukami et al. | 355/91 |
| 4,281,922 | 8/1981 | Matsumoto | 355/100 X |
| 4,408,872 | 10/1983 | Vaughan | 355/28 |
| 4,479,710 | 10/1984 | Vaughan | 355/28 |

Primary Examiner—Richard A. Wintercorn
Attorney, Agent, or Firm—Lowe, Price, LeBlanc, Becker & Shur

[57] ABSTRACT

A copying machine has a camera unit and a developer unit connected through a coupler, wherein the coupler includes feed paths along which a length of film is fed before and after exposure to a focused image of an original; a film cassette located adjacent to the feed path; a film carrier for supplying a length of unexposed film to the photographic or camera section, the film carrier being capable of running to and fro along a portion of the feed paths; an overlay sheet holder provided in opposite to the film carrier and movable in synchronism therewith; a transparent platen on which the film is placed with an overlay sheet covered thereon to shut out extraneous light; and a film sucking means mounted on the film carrier whereby a length of film after exposure is fed to the developer unit by being held by suction at its terminating end.

19 Claims, 8 Drawing Figures

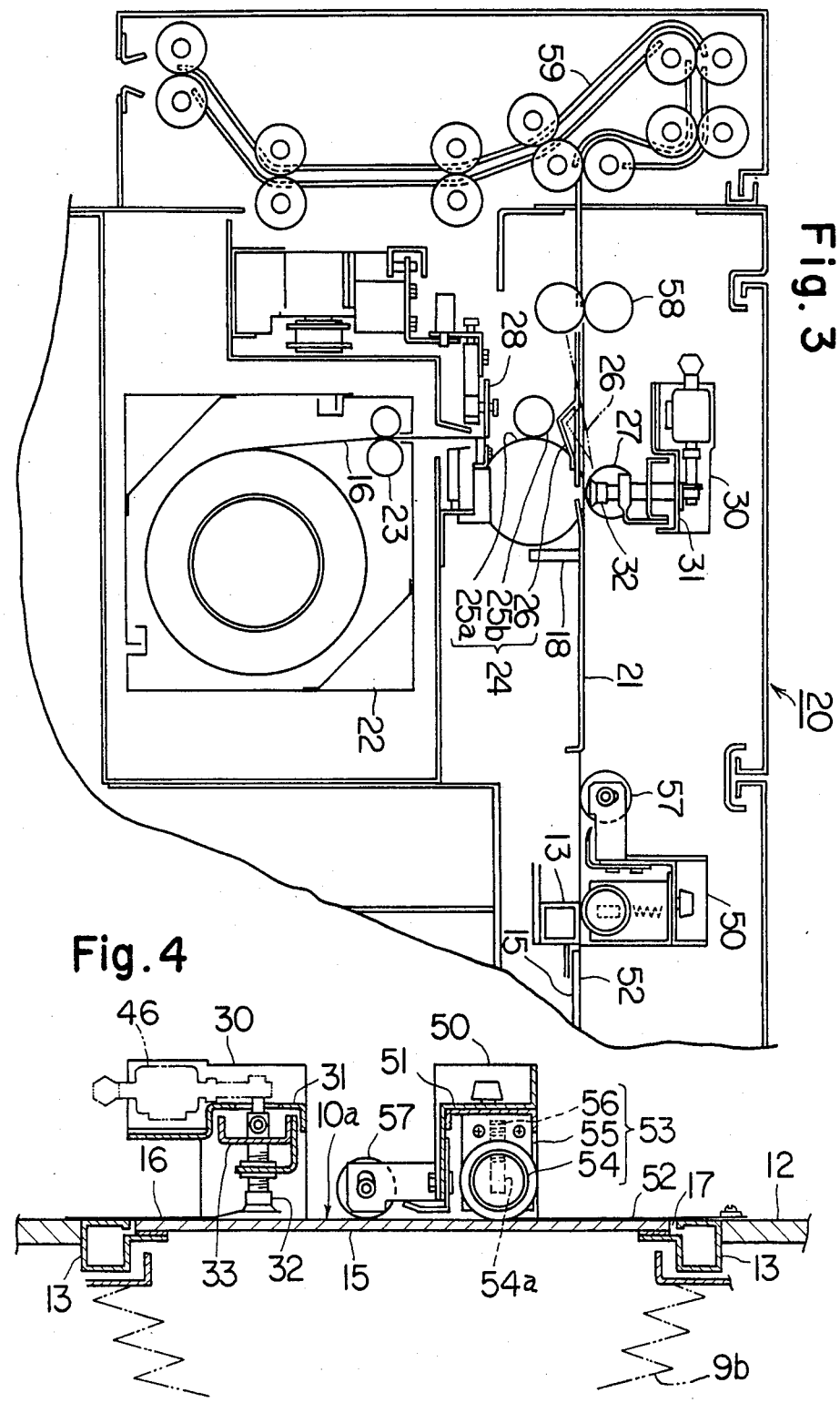

COPYING MACHINE

BACKGROUND OF THE INVENTION

1. Field of the Invention

The present invention relates to a copying machine with a developer unit, and more particularly to a copying machine in which a camera unit and a developer unit are united so that the camera work can be done in brightness.

2. Description of the Prior Art

The copying machine including a camera unit and a developer unit is known and used, and one example thereof is disclosed in Japanese Laid-Open No. 58-189622. This prior art machine includes a vertical type camera capable of working in brightness, and a handy developer unit mounted on a base plate extended from the camera unit. The photographic section includes a transparent plate provided on the base plate on which an image is produced. A film feeder holding a rolled film is provided at an end of the base plate and the developer unit is provided at the other end thereof. The transparent plate is covered with an overlay sheet that does not allow light to pass through. The film is sent between the transparent plate and the overlay sheet (by utilizing the rigidity of the film) cut to a desired length, and kept in contact with the transparent plate. Then the film is exposed to light. The exposed film is pushed to the the developer unit by utilizing the rigidity of the film. Finally the exposed film is subjected to developing treatment. The series of operations is conducted in brightness.

The known system mentioned above has many disadvantages: one is that owing to its inefficient developing power it is difficult to produce with it an original film for a process which requires the reproduction of a high quality picture.

In order to feed the film successfully the film is required to be of considerable thickness, e.g., if it is as little as 0.07 m/m thick, it is difficult to feed the film.

A further disadvantage is that the film is liable to become scratched when it passes between the transparent plate and the overlay sheet. In addition, it is subject to strong friction, due to static electricity, thereby hampering smooth feeding of the film.

Furthermore, under the known system, it is necessary to provie a gap, ahead of time between the transparent plate and the overlay sheet so as to pass the film through. After the film is placed at a desired position the air is drawn out so as to fix the film thereto. After the film is exposed to light it is discharged. To effect the discharge of the film, a gap must be produced between the transparent plate and the overlay sheet. As a result, a subsequent operation in the series cannot start until the previous operation is finished, thereby prolonging the time of operation.

SUMMARY OF THE INVENTION

The present invention aims at solving the problems pointed out above, and has for an object to provide a copying machine with a developer unit for producing an original for a process capable of reproducing a high quality picture.

Another object of the present invention is to provide a copying machine with a developer unit, requiring a minimum of space for its installation.

A further object of the present invention is to provide a copying machine with a developer unit, capable of feeding a film or any other photosensitive sheet meterial which normally is so supple as to be difficult to feed into place for processing.

A still further object of the present invention is to provide a copying machine with a developer unit, ensuring that the film is protected against becoming damaged during transport.

Another object of the present invention is to provide a copying machine with a developer unit, capable of shortening the time required for feeding and discharging the film, thereby saving the working time required to operate the machine.

According to one aspect of the present invention, there is provided a copying machine including a camera unit and a developer unit connected together through a coupler, the machine including:

- a base plate extended from the camera unit, the base plate including a transparent platen on which an image is produced;
- an overlay sheet holder located on the camera unit, the holder containing an overlay sheet for covering the film placed on the transparent platen;
- a film supply means provided at a point under a film feed path arranged in the same plane as the transparent planten;
- means for introducing unexposed film onto the film feed path from the film supply means, the means including a cutter unit for cutting the unexposed film to a desired length; and
- a film carrier for supplying the unexposed film onto the transparent platen and discharging a length of exposed film therefrom, the film carrier being capable of running to and fro along the film feed path and the transparent platen, the film introducing means comprising swingable guide means for defining the film feed path, and also including reversibly rotative film-introducing rollers and press rollers.

According to another aspect of the present invention, there is provided a copying machine including a camera unit and a developer unit connected together through a coupler, the machine comprising:

- a base plate extended from the camera unit, the base plate including a transparent platen on which an image is produced;
- an overlay sheet holder located on the camera unit, the holder containing an overlay sheet for covering the film placed on the transparent platen;
- a film cassette provided at a point under a film feed path arranged in the same plane as the transparent platen:
- means for introducing unexposed film onto the film feed path from the cassette, the film-introducing means including a cutter unit for cutting the unexposed film to a desired length; and
- a film carrier for supplying unexposed film onto the transparent platen and discharging a length of exposed film therefrom, the film carrier including a first carrier capable of running above the transparent platen, a plurality of vacuum suckers connected to a vacuum pump, and means for carrying the suckers the sucker-carring means being mounted on the first carrier through a lift in such a manner as to descend and ascend,
- wherein the overlay sheet holder includes a second carrier capable of ascending upward above the transparent platen, the second carrier holding a rolled overlay sheet, and rollers provided in the second carrier, the rollers being adapted to press film which has been released from the suckers.

According to a further aspect of the present invention there is provided a copying machine including a camera unit and a developer unit connected together through a coupler, the machine comprising:

a film carrier including means for carrying a plurality of suckers; and an overlay sheet holder for containing a rolled overlay sheet adapted to cover the film placed on a transparent platen on which an image is produced, the film carrier and the overlay sheet holder being located at opposite ends of a base plate extended from the camera unit, wherein the film carrier and the overlay sheet holder are movable toward and away from each other, wherein the film carrier is moved to the starting point of the overlay sheet holder, with the film being held by the suckers at its forward end, and the overlay sheet holder being moved to a point determined in accordance with the length of the film at a given point of time after the data is input and before the film carrier stops at a predetermined point, after the film carrier has moved to the predetermined point the film is released from the suckers on the transparent sheet, the overlay sheet holder is moved toward the film carrier until the film carrier and the overlay holder take come to the predetermined respective positions they move together to the starting point of the film carrier, thereby covering the whole surface of the transparent sheet with the overlay sheet, at this stage the film being exposed to light.

BRIEF DESCRIPTION OF THE DRAWINGS

FIG. 3 is a front view of the coupler connecting the camera unit and the developer unit, particularly illustrating a main section thereof;

FIG. 4 is a cross-sectional view of the photographic section of the machine shown in FIG. 1;

DETAILED DESCRIPTION OF THE PREFERRED EMBODIMENT

Figure 1:
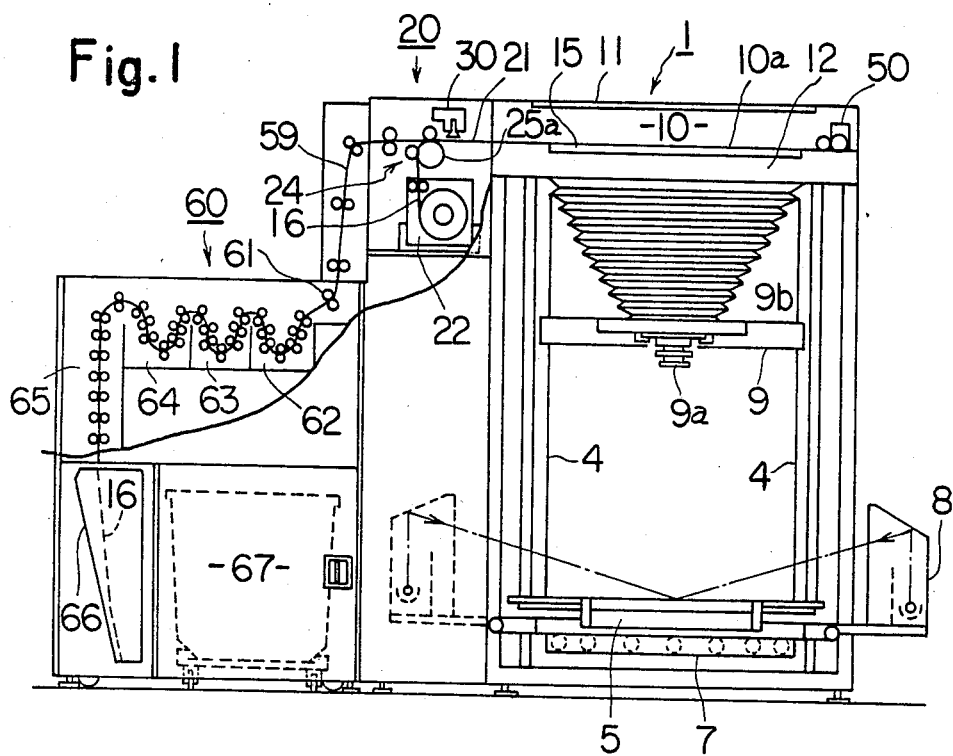
FIG. 1 is a front view, partly broken, showing a copying machine embodying the present invention.

As shown in FIG. 1, there is provided a vertical camera unit 1 and an automatic developer unit 60 connected to each other by means of a coupler 20.

Figure 2:
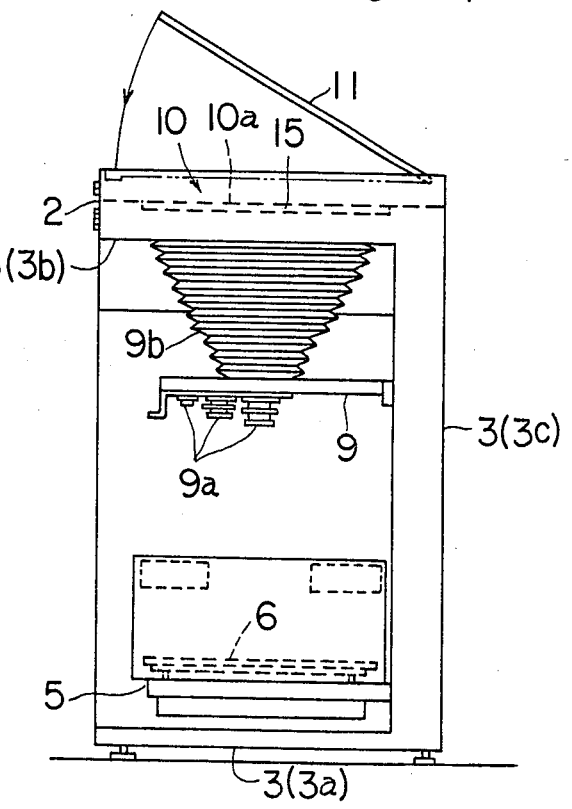
FIG. 2 is a right-hand side view of the copying machine of FIG. 1.

Referring to FIG. 2, the vertical camera unit 1 includes a framework 3 having a foot portion 3a, a rear upright wall 3c and a ceiling portion 3b. A photographic section 10, where exposed film is to be exposed to produce an image thereon is provided on the ceiling portion 3b, which is covered with a cover 11 pivotally supported on the framework 3. A guide rail 4 is provided along the upright wall 3c. A lens support 9 is movably carried on guide rail 4. Likewise, an original carrier 5 having a transparent plate 6 is movably carried on the guide rail 4. 7 denotes a light source for emitting light through the original placed on the original carrier 5, and there are also provided lights 8 for reflecting light on the original as needed thus. An image of the original is projected on a photographic surface 10a in the film exposure section 10. 2 and 9b denotes a console and a bellows unit, respectively.

Referring to FIG. 4, the image producing photographic section 10 includes a base plate 12 which is provided with a transparent plate 15 (also referred to in the art as a "platen") supported by means of a tubular framework 13 fixed thereto. The transparent plate 15 provides the photographic surface 10a on which a sheet of photosensitive material, hereinafter referred to as film 16, is placed by means of a carrier 30. The film 16 is covered with an overlay sheet 52 from an overlay sheet holder 50.

The air present in a gap 17 between the transparent platen 15 and the overlay sheet 52 is sucked away by a known suction means (not shown) through the tubular pupe 13. For this purpose, the gap 17 opens in the pipe 13. The drawing away of the air in the gap 17 causes the overlay sheet to be drawn into airtight contact with the upper surface of platen 15 with filter 16 sandwiched therebetween.

As shown in FIG. 3, the coupler 20 is located between the camera unit 1 and the developer unit 60, and includes a film feed path 21 horizontally supported in such a manner that is is connected to the photographic surface 10a. Under the path 21, a cassette 22 is provided which accommodates the film 16 in a rolled form in its exposed state. A film introducing mechanism 24 is also provided whereby the film 16 is introduced into the path 21. Above the path 21, the film carrier 30 is provided in such a manner as to enable it to move to and fro between the base plate 12 and the coupler 20, wherein the carrier 30 is located in opposition to the film unit 50. The rolled film 16 in its unexposed state is fed out by a roller 23 of the cassette 22, and its forward end is inserted into the path 21 by means of a driving roller 25a, a press roller 2 5b and a guide member 26 positioned in the state shown by phantom lines.

That forward end of the film 16 which is introduced into the path 21 is nipped by the driving roller 25a and nip rollers 27, and kept at rest temporarily, the nip rollers being arranged at equal intervals above the driving roller 25a. A plurality of suckers capable of ascending and descending, suck the arrested film 16 at its forward end and as soon as the nip rollers 27 separate from the driving roller 25a, raises the forward end of the film 16. In this way, the film 16 is transported to the photographic section 10.

28 denotes a rotary cutter unit located adjacent to the outlet of the film cassette 22 whereby the film 16, protruded by the roller 25a and the suckers 32, is cut to a desired length. The driving roller 25a is reversely rotated when the film 16 is to be discharged following exposure. The terminating end of the film 16 is detected by a sensor of known type (not shown).

Referring to FIGS. 3–7 the film carrier 30 includes a first carrier 31, a holder 33 for supporting the suckers 32 and a lift 40 carrying the holder 33, the lift 40 being capable of ascending and descending with the holder 33.

Figure 6:
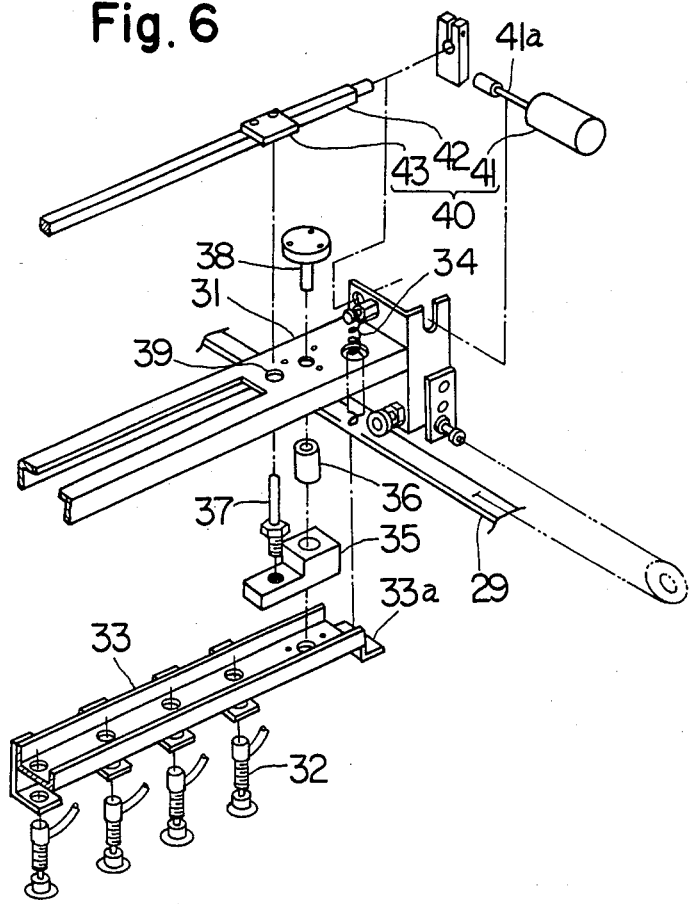
FIG. 6 is an exploded perspective view of the film carrier.

The carrier 31 runs on a pair of rails 29 spanning the space between the path 21 of the coupler 20 and the base plate 12 of the camera unit 1. As shown in FIG. 6, the first carrier is provided with the sucker holder 33 which can descend and ascend together with a lift 40.

The sucker holder 33 preferably supports a plurality of suckers 32 arranged at given intervals (L), and its opposite ends 33a are connected to the first carrier 31 by means of coil springs 34. Adjacent to each of the ends 33a, a block 35 is provided to guide the lift 40. The guide block 35 includes a thrust bearing 36 and a pin 37 for the lift 40. The thrust bearing 36 bears a lift-guide pin 38 affixed to the first carrier 31, and the pin 37 is projected upward through a hole 39 of the first carrier 31.

The lift 40 is provided with a solenoid 41 located at an end portion of the first carrier 31, a rotating shaft 42 operated by a push rod 41a of the solenoid 41, and an abutment piece 43 for pushing down the pin 37 against the coil spring 34. The solenoid 41 is operated by a control circuit (not shown). In this way, the sucker holder 33 is caused to ascend and descend.

Figure 7:
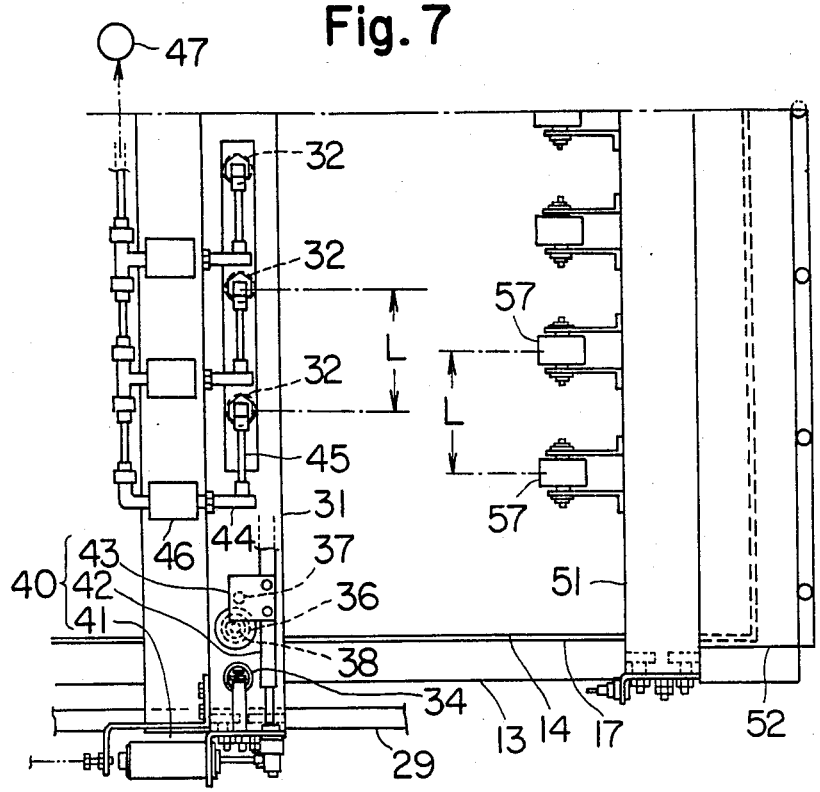
FIG. 7 is a plan view showing the photographic section of the machine.

Each sucker 32 is constructed as shown in FIG. 7, i.e., each sucker is connected to a duct 44 arranged on the first carrier 31 through a flexible pipe 45, the duct 44 being connected to a vacuum pump 47 through an electromagnetic valve 46 which is adjusted in accordance with the size of the film 16.

The overlay sheet holder 50 includes a second carrier 51 which is mounted on the base plate 12 of the camera unit 2 in such a manner as to move in parallel with the first carrier 31, a winder unit 53 for holding the overlay sheet 52 which is fixed to the right-hand end of the transparent platen 15, and a plurality of rollers 57 rolling on the the transparent platen 15.

The winder unit 53 contains a winding roller 54 provided with a coil spring, the winding roller 54 having a shaft whose ends 54a are supported on bearings 55 fixed to the opposite ends of the second carrier 51. The winding roller 54 is pressed on the surface 10a of the transparent platen 15 by means of a spring 56.

Figure 5:
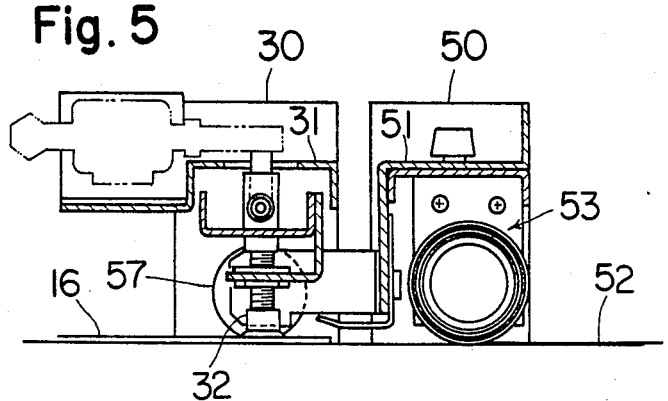
FIG. 5 is a schematic view showing the film carrier and the overlay sheet holder approaching each other.

As shown in FIG. 7, the rollers 57 are arranged at intervals (L) equal to those of the suckers 32 on the side of the second carrier 51 toward the first carrier 31. When the first carrier 31 and the second carrier 51 come closest to each other, the suckers 32 and the rollers rollers 57 are aligned in a row as shown in FIG. 5.

In FIG. 3, 58 and 59 denote a film discharge roller, and a guide unit 59 carrying a plurality of guide rollers, respectively. The film 16, after exposure to an image, is guided to the auto-developer unit 60. In the illustrated embodiment, there is provided a gap between the base plate 12 of the camera unit 1 and the feed roller 61 of the developer unit 60, thereby necessitating the use of the guide unit 59. However is no gap is present, the guide unit 59 can be dispensed with.

A known device can be used for the developer unit 60, in which a length of exposed fiom 16 fed by the feed rollers 61 is passed through a treatment tank 62, a setting tank 63, a cleasing tank 64 and a drying chamber 65, consecutively. The dried developed film 16 is discharged onto a receiver 66. The reference numeral 67 denotes a wagon (not shown) for carrying containers holding the liquids used for the respective treatments mentioned above. By making up for the shortage of each liquid from the container, the developing process may be continued without brakes over a long period of time.

Figure 8:
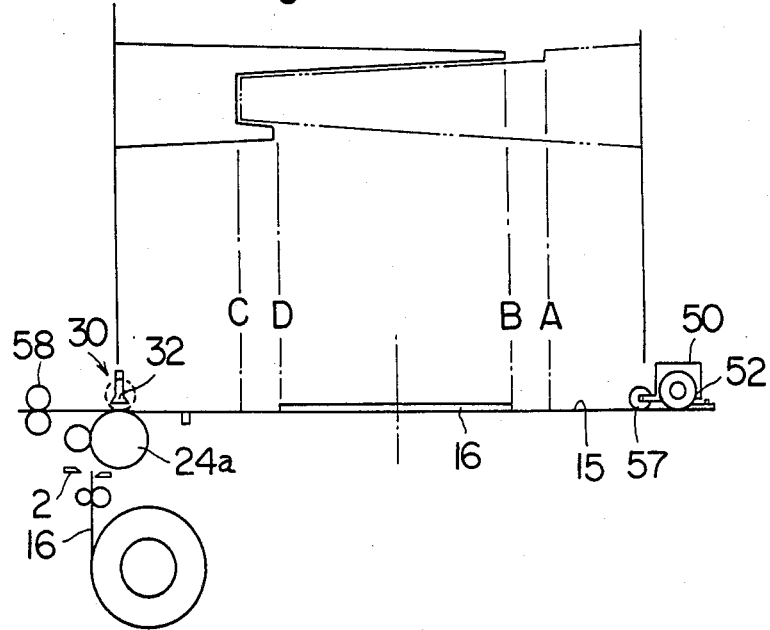
FIG. 8 is an explanatory view showing the relationship between the film carrier and the overlay sheet holder.

Referring to FIG. 8 the process from the supply to the discharge of the film will be described, as follows.

By pressing buttons on console 2, the data with respect to the size of the original, the desired magnification and other necessary factors are input and the operation is started by a user of the apparatus. Based on the input data, the required length of the unexposed film is determined, and in the camera unit 1 the original carrier 5 and the lens support 9 are caused to move until the desired magnification is attained. Meanwhile the rolled film 16 in the coupler 20 is sent out by the rollers 23, and the forward end of the sent-out film is introduced into the path 21 where this portion is nipped by the roller 25a and the nip rollers 27, and caused to stop for a moment.

At this stage the suckers 32 descend to suck the forward end of the film 16, and the nip rollers 27 are separated from the rollers 25a. The suckers 32 are caused to ascend with the unexposed film 16 attracted thereto by suction so that the film moves toward the photographic section 10 by a predetermined distance. Subsequently the cutter unit 28 operates to cut the unexposed film 16 to a previously determined length. The cut film is then conveyed forward during which its terminating end is detected by the sensor 18, in response to which the sensor generates a signal to the holder 50 so as to enable same to move toward the center of the transparent platen 15 and stops at a waiting place (A) previously determined in accordance with the length of the cut unexposed film 16, to wait for the film carrier 30 to arrive at a predetermined place (B). When the film carrier 30 arrives at predetermined place (B) and stops for a moment above the transparent platen 15, the film 40 operates so as to place the film 16 on the transparent platen 15 and the suction by suckers 32 is stopped. At this stage, the holder 50 resumes its advance, thereby causing the rollers 57 to mount on the film 16, until the suckers 32 and rollers 57 come to line up at the place of delivery (B). With keeping the sucker 32 and the rollers 57 in a row the film carrier 30 and the overlay sheet holder 50 move in synchronism to the starting point of the film carrier 30.

The holder 50 and the carrier 30 move until the overlay sheet 52 covers the entire surface of the transparent plate 15, this position being indicated by (C) in FIG. 8. When the arrive at (C), the air present between the transparent plate 15 and the overlay sheet 52 is sucked by suction applied via a slit 17, thereby keeping the overlay sheet 52 in airtight contact with the transparent plate. In this state the film 16 sandwiched between overlay sheet 52 and platen 15 is exposed to light.

After the length of unexposed film 16 is exposed to light it is exposed film, the overlay sheet 52 is released from the transparent plate 15 by stopping the suction applied therebetween, and the film carrier 30 and the holder 50 are shifted toward the starting point of the holder 50. When the holder 50 and the film carrier 30 move to the terminating end of the cut length of what is now exposed film 16, indicated by (D), the film carrier 30 alone stops. At this stage, the lift 40 operates so as to allow the sucker holder 33 to descend, thereby causing the suckers 32 to press the terminating end of the film. When the holder 50 moves beyond the place of delivery (B) toward its starting point, the suckers 32 suck the terminating end of the exposed film 16 and the sucker holder 33 is caused to ascend. When the sucker holder 33 is raised, the film carrier 30 is moved toward its starting point so as to insert the terminating end of the film 16 into between the rollers 24a and the nip rollers 27. Then the rollers 24a are reversely rotated so as to send the exposed film toward the developer unit. At this time, the guide member 26 shown in FIG. 3 returns to the position indicated by unbroken lines, and the exposed film 16 is discharged by a discharge roller 58, and enters the developer unit 60 by way of a guide path 59. In this way, the, exposed film 16 is subjected to a developing treatment.

During the discharge of the exposed film 16 the overlay sheet holder 50 returns to its starting position.

The positions (A), (B), (C) and (D) mentioned above are determined in accordance with the length of the film determined on the basis of data which is previously input by the user.

The overlay sheet 52 can be moved to the position (A) at a given time during the period of time after the data is input in the console and before the film carrier 30 is moved to the position (B) based on the data (this period of time is known from the input data and the speed of carrying the film).

According to the present invention many advantages are realized as follows:

(1) The film supplying device 24 and the film carrier are compactly housed in the coupler 20, thereby simplifying the connection betweed the camera unit 1 and the developer unit 60. This results in a very compact apparatus for installation and, additionally, the developing efficiency is enhanced.

(2) The undeveloped film 16 is sucked at its forward end in the advancing direction and transported under suction. This enables even a very thin or flexible film to be safely fed.

(3) Unlike conventional devices, the film is kept away and does not touch with transparent platen 15 and the overlay sheet 52 as it is moved, thereby avoiding problems caused by static electricity. This ensures a smooth feed of the film free of static electricity, and protects the film surface against scratching or other damage.

(4) The developed film 16 is delivered from the camera unit 1 to the developer unit 60 by being inserted between the suckers 32 and the rollers 25a and 27 without failure. The unexposed film is also exactly located at a desired place on the transparent platen for exposure.

(5) The film carrier for supplying and discharging the films, and the film holder are operated in parallel, thereby shortening the time of operation.

What is claimed is:

1. A copying machine, including a camera unit and a developer unit connected together through a coupler, comprising:
   a base plate extended from the camera unit, the base plate including a transparent platen on which an image is produced;
   an overlay sheet holder located on the camera unit, the holder including an overlay sheet for covering a length of film placed on the transparent platen;
   film supply means for supplying unexposed film, the film supply means being located to provide a film feed path arranged with a portion thereof substantially in the same plane as the transparent platen for supplying unexposed film;
   means for introducing said unexposed film onto the film feed path from the film supply means, the film introducing means including a cutter unit for cutting the unexposed film to a desired length; and
   film carrier means for carrying the unexposed film onto the transparent platen for exposure thereat and for thereafter discharging the length of thus exposed film therefrom, the film carrier means being capable of providing reciprocating motion along the film feed path and the transparent platen, wherein the film-introducing means comprises swingable guide means for defining the film feed path and also includes reversibly rotative film-introducing rollers and press rollers cooperating for moving the unexposed film to the transparent platen and exposed film in opposite direction.

2. The copying machine according to claim 1, wherein the film-introducing means comprises a roller that facilitates said movement of said film before and after said exposure thereof.

3. A copying machine, including a camera unit and a developer unit connected together through a coupler, the machine comprising:
   a base plate extended from the camera unit, the base plate including a transparent platen on which an image is produced;
   an overlay sheet holder located on the camera unit, the holder containing an overlay sheet for covering a length of film placed on the transparent platen;
   a film cassette provided at a point under a film feed path arranged in the same plane as the transparent sheet to supply unexposed film;
   means for introducing a length of unexposed film onto the film feed path from the cassette, the means including a cutter unit for cutting the unexposed film to a desired length; and
   a film carrier for carrying said lenth of unexposed film onto the transparent platen and discharging exposed film therefrom, the film carrier including a first carrier capable of running above the transparent sheet, a plurality of vacuum suckers connected to a vacuum pump for selectively picking up an end of said length of film by suction, and means for carrying the suckers, the carrying means being mounted on the first carrier through a lift in such a manner as to descend and ascend,
   wherein the overlay sheet holder includes a second carrier capable of ascending upward above the transparent platen, the second carrier holding a rolled overlayed sheet, and rollers provided in the second carrier, the rollers being adapted to press film which has been released from the suckers.

4. A copying machine, including a camera unit and a developer unit connected together through a coupler, the machine comprising:
   data input means for providing operational data to said machine;
   a film carrier including means for carrying a plurality of suckers connected to a vacuum pump for applying suction; and
   an overlay sheet holder for containing a rolled overlay sheet adapted to cover a length of film having a forward end and a terminating end placed on a transparent platen on which an image is produced, the film carrier and the overlay sheet holder being located at opposite ends of a base plate extended from the camera unit, wherein the film carrier and the overlay sheet holder are movable toward and away from each other, wherein the film carrier is moved to the starting point of the overlay sheet holder with the film being held by suction applied by the suckers at its forward end, and the overlay sheet holder being moved to a point determined in accordance with the length of the film at a given point of time after data related to said film length is input via said data input means to operate the machine and before the film carrier stops at a predetermined point, the film being releasable from the suckers to be on the transparent platen after the film carrier has moved to the predetermined point, the overlay sheet holder being movable towards the film carrier until the film carrier and the overlay holder arrive at predetermined respective positions and move together to the starting point of the film carrier thereby covering the whole surface of the transparent platen with the overlay sheet, the film then being exposable to light, the film carrier and the overlay sheet holder thereafter being movable together toward the starting point of the overlay sheet holder until they come to the terminating end of the film placed on the transparent platen, whereupon the film carrier along stops whereas the overlay sheet continues to move until it passes the forward end of the film, whereupon the film carrier starts to move to the starting point thereof so as to discharge the exposed film.

5. The copying machine according to claim 4, further comprising:
means for detecting the terminating end of the length of unexposed film, the detecting means being located at an appropriate point on the film feed path so as to ensure that in response to the detection of said terminating end the overlay sheet holder is moved to a point determined in accordance with the length of the unexposed film.

6. A method of producing copies by exposing a film to an image in a copying machine that includes a camera unit for exposing previously unexposed film to the image, a developer unit to develop exposed film and a coupler unit connecting the camera unit to the developer unit, the machine being provided with a supply of unexposed film and developing materials, film guiding means and an overlay sheet to cover unexposed film for exposure thereof, the method comprising the steps of:
introducing a leading end of said unexposed film to a film feed path;
operating said film guiding means to guide said unexposed film toward said camera unit;
cutting off a predetermined length of said unexposed film at a terminating end thereof;
moving said predetermined length of unexposed film to a surface of said camera unit for exposure thereat;
covering said length of unexposed film with a portion of said overlay sheet;
exposing said length of unexposed film;
uncovering said length of said now exposed film by removing said overlay sheet;
operating said film guiding means to guide said now exposed length of film toward said developing unit; and
moving said length of exposed film to said developing unit.

7. The method according to claim 6, wherein:
said step of moving said length of unexposed film comprises lifting said leading end thereof by a predetermined distance to avoid contact of a surface thereof with adjacent surfaces.

8. The method according to claim 6, wherein:
said step of moving said length of exposed film comprises lifting said terminating end thereof by a predetermined distance to avoid contact of a surface thereof with adjacent surfaces.

9. The method according to claim 7, wherein:
said step of moving said length of exposed film comprises lifting said terminating end thereof by a predetermined distance to avoid contact of a surface thereof with adjacent surfaces.

10. The method according to claim 7, wherein:
said lifting is effected by applying suction to said leading end of said length of unexposed film and maintaining said suction until said length of unexposed film is moved into a position for exposure in said camera unit.

11. The method according to claim 8, wherein:
said lifting is effected by applying suction to said terminating end of said length of exposed film and maintaining said suction until said terminating end is in a position to be guided to said developing unit.

12. The method according to claim 10, wherein:
said step of moving said length of exposed film comprises lifting said terminating end thereof by a predetermined distance to avoid contact of a surface thereof with adjacent surfaces; and
said lifting is effected by applying suction to said terminating end of said length of exposed film and maintaining said suction until said terminating end is in a position to be guided to said developing unit.

13. The method according to claim 6, comprising the further step of:
developing said length of exposed film.

14. The method according to claim 7, comprising the further step of:
developing said length of exposed film.

15. The method according to claim 8, comprising the further step of:
developing said length of exposed film.

16. The method according to claim 9, comprising the further step of:
developing said length of exposed film.

17. The method according to claim 10, comprising the further step of:
developing said length of exposed film.

18. The method according to claim 11, comprising the further step of:
developing said length of exposed film.

19. The method according to claim 12, comprising the further step of:
developing said length of exposed film.

* * * * *